United States Patent [19]

Leighton

[11] 4,235,832
[45] Nov. 25, 1980

[54] MOLDING METHOD

[75] Inventor: Robert D. Leighton, Brockton, Mass.

[73] Assignee: Alden Research Foundation, Brockton, Mass.

[21] Appl. No.: 929,404

[22] Filed: Jul. 31, 1978

[51] Int. Cl.³ .............................................. B29C 27/00
[52] U.S. Cl. ................................... 264/230; 264/263; 264/275; 264/276
[58] Field of Search ................. 264/263, 275, 276, 230

[56] References Cited

U.S. PATENT DOCUMENTS

| | | | |
|---|---|---|---|
| 2,463,231 | 3/1949 | Wyatt | 264/263 |
| 3,417,176 | 12/1968 | Anderson et al. | 264/230 |
| 3,834,008 | 9/1974 | Witt et al. | 264/230 |

FOREIGN PATENT DOCUMENTS 959867 6/1964 United Kingdom .................... 264/276

Primary Examiner—James H. Derrington
Attorney, Agent, or Firm—James H. Grover

[57] ABSTRACT

A method of manufacturing an electrical connector utilizing an electrical conducting wire sheathed in a highly elastic, stretchy, squeezable insulating material and embedding it within a thermoplastic material through the use of high pressure injection molding. In the method, the sheathed wire is fitted with a heat shrinkable sleeve of plastic material that is subsequently drawn about the sheathed wire to form a rigid pressure barrier. The assembly is then disposed in a mold with the sleeve disposed in an egress of the mold and the thermoplastic material is injected. The sleeve will form the rigid plug-like cover which prevents the plastic from oozing by the squeezable insulating material.

6 Claims, 7 Drawing Figures

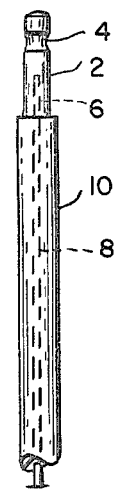 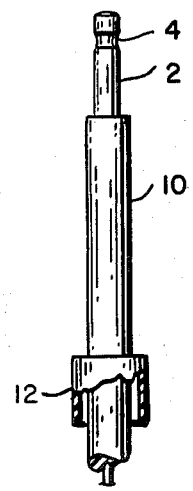 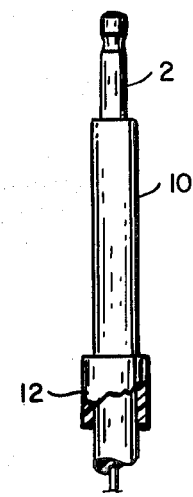 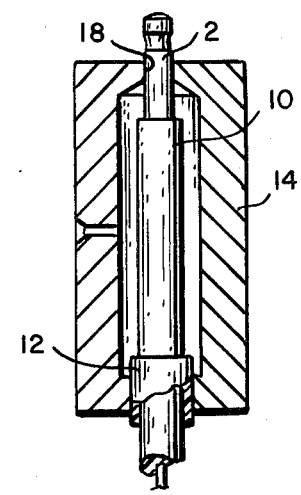
FIG.1　　FIG.2　　FIG.3　　FIG.4
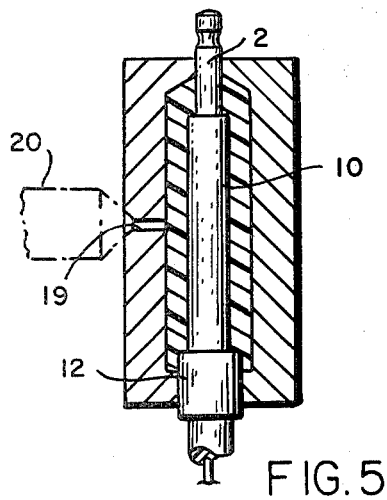
FIG.5
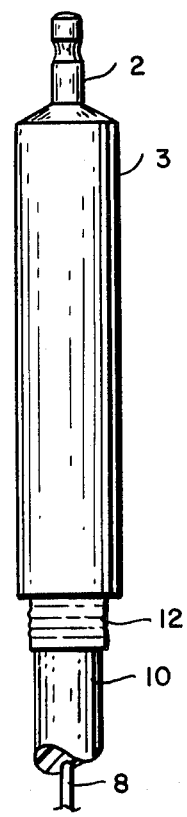
FIG.7
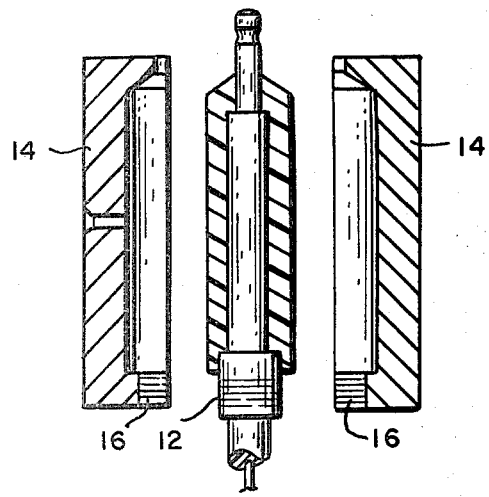
FIG.6

MOLDING METHOD

BACKGROUND OF THE INVENTION

The present invention relates to the manufacture of electrical connectors by injection molding of thermoplastic materials in which a highly elastic, stretchy, squeezable material is utilized as an insulating sheath for an electrical conducting wire.

DESCRIPTION OF THE PRIOR ART

In the past, thermoplastic materials were used to form electrical connectors and these materials have encased wires that were sheathed in insulators. Injection molding techniques for manufacturing such connectors were not wholly satisfactory because the thermoplastic material had to be injected into the mold under high pressures to form the connector. Because the insulated wire had to extend from the mold at an opening, the thermoplastic material squeezed by the insulator and oozed outside of the mold. Such leakage made a product which was less desirable and wasted the thermoplastic material. The use of castable, and/or low pressure plastics was quite time consuming and inefficient because of the molding time, although leakage was avoided.

SUMMARY OF THE INVENTION

According to the present invention, we have discovered that if the insulated wire is first fitted with a heat shrinkable sleeve at the point where the wire will extend through a port in the mold and the sleeve is shrunk tightly about the insulated material, then plastic will not ooze from the mold when it is injected. Such oozing is caused by the fact that most dielectric insulators are highly elastic, stretchy, squeezable and subject to deformation. We have found that leakage will occur at the place where the wire extends outside of the mold when the thermoplastic material is injected under high pressure, generally in the order of 2000 to 7000 pounds per square inch. The insulator will deform slightly and allow the thermoplastic material to flow by. The shrunk sleeve on the insulated wire will form a rigid plug-like cover which prevents leakage of the thermoplastic material, even under high injection pressures. The shrunk sleeve conforms to the shape of the insulated wire and tends to confine it somewhat while the insulator is urging it outwardly. Then when the sleeve is disposed within the thermoplastic material, the insulator urges the sleeve outwardly towards the thermoplastic material and forms a mechanical seal which is relatively impervious to the permeation of water and other contaminants.

BRIEF DESCRIPTION OF THE DRAWING

The present invention may be better understood by reference to the detailed description of a specific embodiment thereof when taken in conjunction with the drawings, in which the Figures show various stages of manufacture of an electrical connector formed of an insulated wire embedded in a thermoplastic material.

DESCRIPTION OF THE PREFERRED EMBODIMENT

Referring now to FIG. 1, a pin 2 is shown having an axial bore 6. A wire 8 is affixed within axial bore 6 and will conduct current from an external source to the connector 2. The wire 8 is sheathed in an insulating material formed of a low durometer composition, generally less than 60 durometers and is stretchy, squeezable and highly elastic, preferably silicone rubber or synthetic carbon based rubbers.

As shown in FIG. 2, connector is fitted with a sleeve 12 of thin wall, tough, heat shrinkable plastic such as PVF2 [Irradiated Polyvinylidene Fluoride (Kynar) manufactured by Roychem Corporation], which when heated, will shrink to conform to the shape of the sheath 10 and form a rigid sleeve around the sheath 10. The sleeve 12 is then heated to between about 200° to 500° F. so as to shrink it about the external surfaces of sheath 10 as shown in FIG. 3 and exert a pressure which will slightly deform the sheath 10 to form a rigid construction. Since the sheath 10 is quite resilient, the heat shrinkable sleeve 12 forms an O-ring-like seal which squeezes the sheath 10 causing the sheath 10 to exert outward force because of its natural tendency to regain its original shape. Only a mechanical bond is formed between the sheath 10 and the sleeve 12 and there is no chemical interaction between the materials. The constant expanding force of the sheath 10 will provide a rigid internal seal as will be apparent in subsequent Figures.

In FIG. 4, the pin 2 is disposed within mold 14 through opening 18 and extending partially external thereof. The insulated wire 10 extends through an opening 16 in the other side. The heat shrunk sleeve 12 is disposed within the opening 16 and rigidly held by notched edges (not shown) disposed therein. The notched edges of the opening 16 will grasp the sleeve 12 and the opening 18 will grasp the pin 2 of the assembly. With this configuration, the insulating sheath 10 will force against the inside of the sleeve 12 and form the equivalent of an O-ring seal with the opening 16. Because the sleeve 12 is rigid after shrinking, it will be firmly grasped by the notches in the opening 16 and form the plug.

Referring now to FIG. 5, the thermoplastic material is injected through a port 19 with a conventional nozzle 20 under pressures in the order of 2000 to 7000 pounds per square inch. Thermoplastic materials used for such injection molding include polypropylene, nylon, polyethylene and polyesters. The thermoplastic material then fills the mold cavity and encases the sleeve 12, the sheath 10 and part of the pin 2. The thermoplastic material cools and shrinks down tightly on sleeve 12 which in turn compresses further the resilient sheath 10 forming an impervious seal of one to the other. Because the sleeve 12 forms a plug in the mold, leakage of the thermoplastic material, even under pressures in the order of 2000 to 7000 pounds per square inch, does not occur. In this embodiment, the thermoplastic material is injected into one port while the other two ports in the mold are sealed off, one by the pin 2 and the other by the sleeve 12. If desired, the mold may be provided with an egress port which can be unblocked during injection of the thermoplastic material to flush entrapped air from the interior of the mold and to insure the complete filling of the chamber with the thermoplastic material.

In FIG. 6, the mold 4 is separated and the formed electrical connector shown in FIG. 6 can be removed. Mating notchings from the opening 16 appear on the sleeve 12 when the connector is removed from the mold. Since thermoplastic material is used, the connector is ready to use when it is removed from the mold and curing is not required for the process.

As shown in FIG. 7, the pin 2 is partially encased within the molded thermoplastic material 3 to form the insulated connector. The thermoplastic material 3 is rigidly formed about a portion of the pin 2 and also encases an inward extension of sheath 10. The sleeve 12 preferably extends outwardly from the body of the thermoplastic material 3 and forms a mechanical bond between the sheath 10 and the thermoplastic material 3.

While the embodiment described relates to the manufacture of male connectors, it is apparent that female connectors can be fabricated using similar techniques in which case there will be no male pin extending externally of the mold. Other devices can also be molded in which there is a need to join a highly elastic material to a thermoplastic material and form a water impervious joint.

It is apparent that modifications and changes can be made within the spirit and scope of the present invention, but it is our intention, however, only to be limited by the scope of the appended claims.

I claim:

1. A method of molding a thermoplastic material about a compressible plastic in which at least one portion of the compressible material extends from the thermoplastic material, the steps which comprise:
   disposing a heat shrinkable sleeve about said compressible material;
   heating said heat shrinkable sleeve to tightly fit about said compressible material and impart rigidity thereto;
   disposing said compressible material in a mold having an opening adapted to receive said compressible material, at least a portion of said sleeve being disposed within said opening so as to form a plug;
   injecting a thermoplastic material into said mold about said compressible material at a pressure in excess of atmosphere and curing to form a solid body, said body being disposed about said compressible material with said heat shrunk sleeve being disposed between said thermoplastic material and said compressible material and forming a mechanical seal which is substantially impervious to the permeation of moisture.

2. The method according to claim 1 wherein said compressible material is a sleeve of insulation surrounding an electrical connector.

3. In a method of manufacturing an electrical connector the steps which comprise:
   disposing a heat shrinkable sleeve about a wire sheathed in a compressible rubber; shrinking said sleeve around said compressible rubber to tightly fit thereabout and provide rigidity;
   placing said insulated wire in an opening in a mold, said opening closely approximating the diameter of the insulated wire;
   locating at least a portion of the heat shrinkable sleeve in said opening so as to form a rigid plug; and
   injecting a thermoplastic material into said mold about said insulated wire at a pressure in excess of atmosphere and curing to form a solid body, said body being disposed about said compressible material with said heat shrunk sleeve being disposed between said thermoplastic material and said compressible material and forming a mechanical seal which is substantially impervious to the permeation of moisture.

4. The process according to claim 3 wherein said heat shrinkable sleeve extends on both sides of said opening in said mold.

5. The process according to claim 3 wherein the insulator of said wire is a stretchy, squeezable, highly elastic material of less than 60 durometers.

6. The process according to claim 3 wherein said insulator is formed of silicone rubber and said thermoplastic material is a member selected from the group consisting of polypropylene, nylon, polyesters and polyethylene.

* * * * *